(12) United States Patent
Murillo et al.

(10) Patent No.: US 7,849,102 B2
(45) Date of Patent: Dec. 7, 2010

(54) AVAILABILITY DATA SERVICE

(75) Inventors: Dan Murillo, Seattle, WA (US); Jason Mayans, Bothell, WA (US); Suryanarayana Murty Gorti, Redmond, WA (US); William R. Avery, Redmond, WA (US); Alvin Mok, Boston, MA (US)

(73) Assignee: Microsoft Corporation, Redmond, WA (US)

( * ) Notice: Subject to any disclaimer, the term of this patent is extended or adjusted under 35 U.S.C. 154(b) by 551 days.

(21) Appl. No.: 11/267,349

(22) Filed: Nov. 4, 2005

(65) Prior Publication Data
US 2007/0055669 A1 Mar. 8, 2007

Related U.S. Application Data

(60) Provisional application No. 60/714,680, filed on Sep. 7, 2005.

(51) Int. Cl.
G06F 17/30 (2006.01)
(52) U.S. Cl. .................................... 707/783
(58) Field of Classification Search ............ 707/9, 707/100, 783; 705/9
See application file for complete search history.

(56) References Cited

U.S. PATENT DOCUMENTS

| | | | | |
|---|---|---|---|---|
| 5,129,057 | A | 7/1992 | Strope et al. ............... | 395/161 |
| 6,085,166 | A | 7/2000 | Beckhardt et al. ........... | 705/9 |
| 6,216,110 | B1 | 4/2001 | Silverberg .................. | 705/9 |
| 2002/0138326 | A1* | 9/2002 | Parker et al. ................ | 705/9 |
| 2003/0130882 | A1 | 7/2003 | Shuttleworth et al. ........ | 705/8 |
| 2005/0102245 | A1 | 5/2005 | Edlund et al. ............... | 705/80 |
| 2005/0102368 | A1* | 5/2005 | Forman et al. .............. | 709/207 |
| 2005/0165631 | A1 | 7/2005 | Horvitz ...................... | 705/7 |
| 2005/0289202 | A1* | 12/2005 | S et al. ..................... | 708/112 |
| 2005/0289354 | A1* | 12/2005 | Borthakur et al. ........... | 713/182 |
| 2006/0142005 | A1* | 6/2006 | Takaluoma et al. ......... | 455/435.1 |

FOREIGN PATENT DOCUMENTS

EP 0 342 140 A2 11/1989

OTHER PUBLICATIONS

Microsoft Corporation, Microsoft Office Outlook 2003 Product Guide, Published 2004.*

(Continued)

*Primary Examiner*—James Trujillo
*Assistant Examiner*—Amresh Singh
(74) *Attorney, Agent, or Firm*—Merchant & Gould P.C.

(57) ABSTRACT

Real time availability data (free/busy data) is provided for potential meeting attendees and/or assets. An availability service is queried for availability data for one or more attendees and/or meeting assets. The availability service determines the identity of an electronic mailbox server on which is stored current real time calendaring data for the desired attendees and/or assets. The requested data is retrieved by the availability service from one or more mailbox servers having data for each attendee and/or asset. Potential attendees may set permissions on their respective availability data to restrict the amount and types of data that may be retrieved by a given data requester. Data queries and data responses may be structured according to the Extensible Markup Language (XML) and application programming interfaces (API) may be exposed for allowing requesting applications to efficiently call the availability service for availability data.

17 Claims, 3 Drawing Sheets

OTHER PUBLICATIONS

Markus Klein, "Free/Busy Folders in Exchange Server 2003 in Depth," Sep. 15, 2005, 5 pgs., http://www.msexchange.org/tutorials/FreeBusy-Folders-Exchange-Server-2003-Depth.html.

Matt Riggsby et al., "Mastering Lotus Notes and Domino 6," Chapter 14—Managing Notes E-Mail with a Browser, Sybex, Inc., Copyright 2003, pp. 361-379.

First Chinese Office Action, dated May 8, 2009, issued in Application No. 200680032563.2, 9 pages.

Patricia Cardoza, *Special Edition Using Microsoft Office Outlook 2003* (Sep. 2003), ch. 13, pp. 311-330.

Third Chinese Office Action, dated May 8, 2009, issued in Application No. 200680032563.2, 9 pages.

"CommuniGate Pro MAPI Connector", https://mail2.cni.org/Guide/MAPI.html, 11 pgs.

"The Server Side of Calendaring". http://www.windowsitpro.com/Articles/Index.cfm?ArticleID=8649&DisplayTab=Article, 6 pgs.

"Contextual Collaboration", http://www.windowsitpro.com/MicrosoftExchangeOutlook/Article/ArticleID/24860/MicrosoftExchangeOutlook_24860.html, 4 pgs.

* cited by examiner

AVAILABILITY DATA SERVICE

CROSS-REFERENCE TO RELATED APPLICATIONS

This patent application claims priority to U.S. patent application Ser. No. 60/714,680, filed Sep. 7, 2005 and entitled "Free Busy Service (Outlook/Exchange)," the disclosure of which is expressly incorporated herein, in its entirety, by reference.

BACKGROUND

Modern electronic calendaring systems allow users to manage calendar data such as meetings, appointments, holidays, personal time, and the like via an electronic calendar user interface in a manner similar to managing such data in a manual calendar except with all the added efficiencies expected from electronic systems such as the ability to easily enter and edit data and the ability to review data in a variety of different views, for example, daily views, weekly views, etc. One particular benefit of electronic calendaring systems is the ability to schedule meetings with one or more attendees and/or assets (e.g., conference rooms, video teleconference equipment, and the like) based on free or busy data (availability data) that may be retrieved for desired meeting attendees and/or assets before scheduling is performed. For example, if a meeting organizer desires to set up a meeting with three attendees in a given conference room, the organizer may request data as to when the desired attendees and conference room are available.

According to prior methods and systems, availability data for potential attendees (for example, employees of a given organization) and/or availability data for organization assets (for example, conference rooms, video teleconference equipment, etc.) is published on a periodic basis to one or more public data folders for access by meeting organizers' calendaring applications. Unfortunately, with such methods and systems, the free/busy (availability) data for potential attendees and/or potential assets is only as good as the last publication of data to the public data folders. Thus, the availability data is often out of date at the time a meeting organizer schedules a meeting. If the organizer schedules a meeting during a period in which the availability data is out of date, the meeting may be scheduled based on erroneous availability data for one or more attendees or assets. As a result, the meeting may not be attended by one or more persons, and a desired asset may be in use by another party during the scheduled meeting. Additionally, with such systems, the ability to retrieve availability data is typically restricted to relatively short periods into the future, and potential attendees have very little control over who may retrieve their availability data.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

The present invention solves the above and other problems by providing methods, systems, and computer products for providing real time availability data (free/busy data) for potential meeting attendees and/or assets. According to an embodiment of the invention, an availability service is queried for availability data for one or more attendees and/or meeting assets. The availability service determines the identity of an electronic mailbox server on which is stored current real time calendaring data for the desired attendees and/or assets. If the electronic mailbox for one or more attendees or assets is maintained on an electronic mailbox server associated with a different availability service, the availability data query is passed from the first availability service to a second availability service associated with the appropriate mailbox server.

The requested data is retrieved by the availability service from the one or more mailbox servers having data for each attendee and/or asset. According to one embodiment, attendees may set permissions on their respective availability data to restrict the amount and types of data that may be retrieved by a given data requestor. Once requested availability is returned to the availability service from the appropriate mailbox server, the availability service then forwards the returned availability data back to the requesting calendaring application for use in scheduling a meeting with the desired attendees and/or assets.

According to another embodiment, data queries and data responses sent and received between a requesting calendaring application and the availability services and one or more mailbox servers are formatted according to the Extensible Markup Language (XML) to allow data requests and retrieval to be more efficient. Additionally, application programming interfaces (API) are exposed for allowing third party requesting applications to understand the formatting and layout of data requests and responses sent to and returned via the application services.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to methods, systems and computer products for retrieving real time availability data (free/busy data) via an availability service for use by a requesting calendaring application for scheduling meetings and/or asset use with one or more meeting attendees and/or assets. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
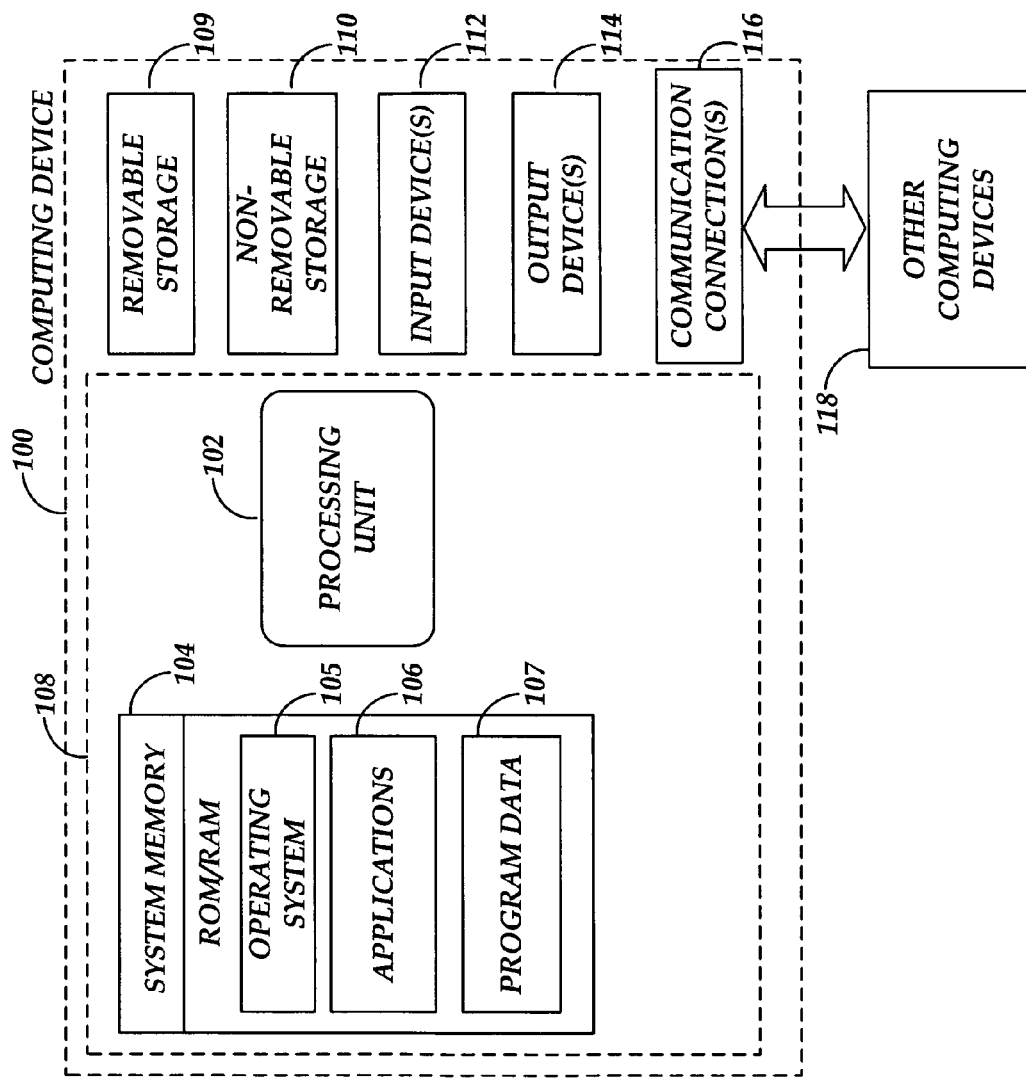
FIG. 1 illustrates an exemplary computing operating environment for embodiments of the present invention.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications 106 and may include program data 107. This basic configuration is illustrated in FIG. 1 by those components within dashed line 108.

According to embodiments of the invention, the application 106 may comprise many types of software applications, such as an electronic mail program, a calendaring program, an Internet browsing program, and the like. An example of such programs is OUTLOOK® manufactured by MICROSOFT CORPORATION. The application 106 may include a number of other types software applications including a multiple-functionality software application for providing many other types of functionalities. Such a multiple-functionality application may include a number of program modules, such as a word processing program, a spreadsheet program, a slide presentation program, a database program, and the like. An example of such a multiple-functionality application is OFFICE™ manufactured by MICROSOFT CORPORATION. According to embodiments of the present invention, the application 106 is illustrative of any software application with which an electronic document (including electronic mail messages) may be created or edited and in which a lightweight information user interface may be utilized for providing information associated with a selected text item, data item or other object in the electronic document.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
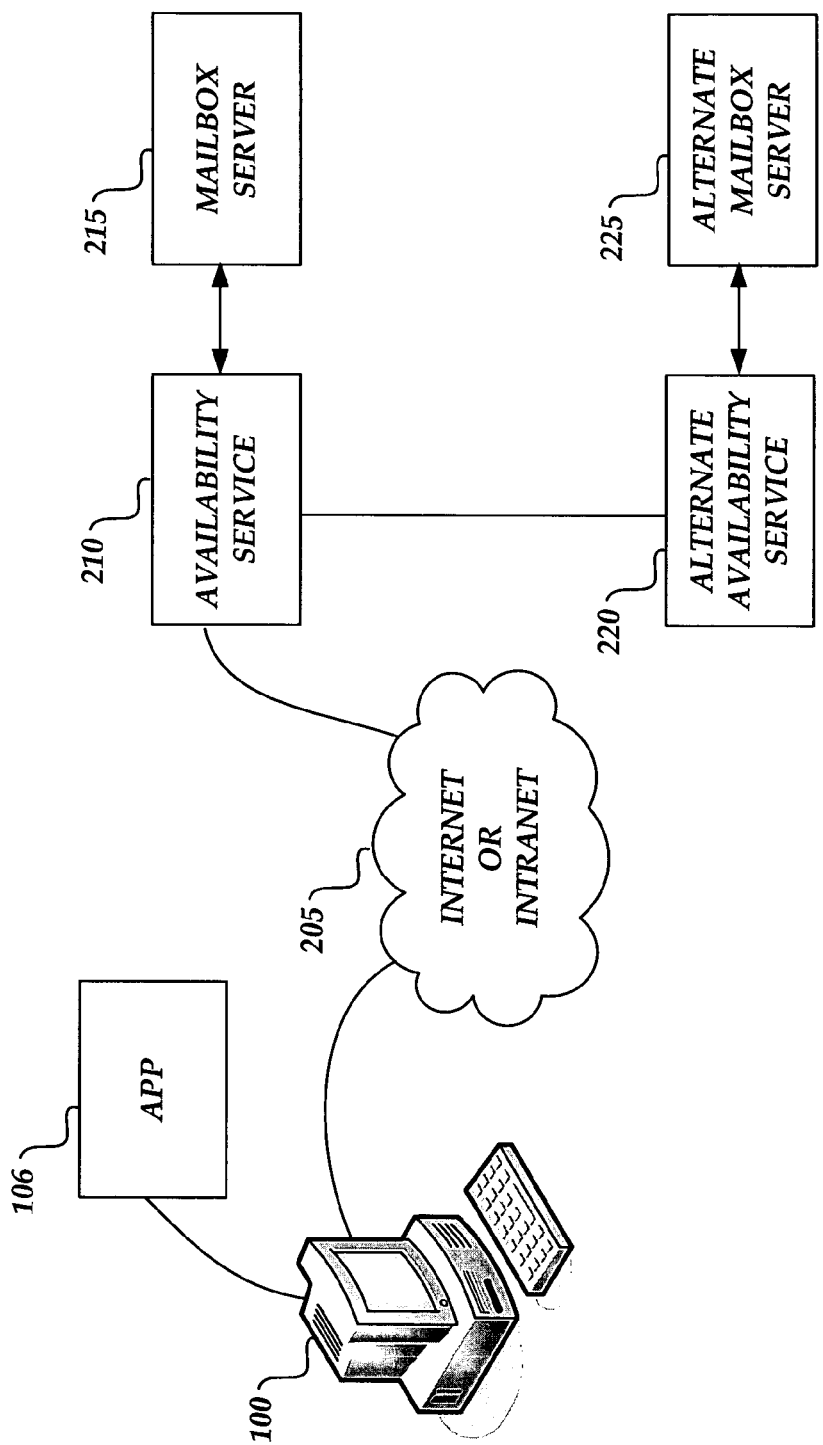
FIG. 2 is a simplified block diagram illustrating interaction between a requesting calendaring application and an availability service and one or more mailbox servers according to embodiments of the present invention.

FIG. 2 is a simplified block diagram illustrating interaction between a requesting calendaring application and an availability service and one or more mailbox servers according to embodiments of the present invention. According to embodiments, a meeting organizer or other user desiring to schedule a meeting with one or more potential attendees and/or one or more potential assets (for example, conference rooms, video teleconference equipment, etc.) may request free/busy availability data for the desired attendees or assets using the organizer's calendaring application 106. When a meeting request is initiated via the calendaring application 106, an availability data request or query is passed from the application 106 to an availability service 210 over a distributed computing network such as the Internet or intranet 205. As should be appreciated, all components described herein may be operated on a local computing device such that the availability data request is not passed over a distributed computing network 205, but is passed to the availability service 210 maintained on the local computer 100. Meeting availability data is retrieved by the availability service from one or more mailbox servers for returning to the calendaring application 106, as described below.

According to embodiments, the availability service 210 is a software application having sufficient computer executable instructions for receiving an availability data query from the application 106 and for passing the availability data query to one or more mailbox servers 215 for obtaining real time availability data for one or more potential attendees and/or assets. As described below, the availability service 210 is further operative to pass an availability data query to an alternate availability service 220 if data requested by a given data query is located on an alternate mailbox server 225 that is accessible from an alternate availability service 220. According to this embodiment, when data is returned from the alternate mailbox server 225 to the alternate availability service 220, the data is then passed back to the first or requesting availability service 210 for ultimate transmission back to the requesting application 106.

The mailbox servers 215, 225 are software applications having sufficient computer executable instructions for receiving and storing electronic mail data, calendar data, availability state data (free/busy data), contacts data, tasks data, and the like for one or more persons (potential attendees) and/or assets. For example, a given mailbox server 215, 225 may be operated by an organization for storing, receiving and sending electronic mail data, including calendaring data and asset utilization data, for persons and assets associated with and operated or maintained by the organization.

A client access server (not shown in FIG. 2) may also be provided which is a software application having sufficient computer executable instructions for allowing access to electronic mail and calendaring data by client side electronic mail and calendaring applications operated by permitted users of an associated mailbox server. That is, the client access server operates as a conduit from individual client electronic mail and calendaring applications 106 to mailbox servers 215, 225 at which electronic mail and calendaring information may be stored. As should be appreciated, according to embodiments of the present invention, the availability service 210, 220 may take the place of a client access server for allowing availability data to be retrieved from a given mailbox server by a client application 106.

According to embodiments of the invention, each of the availability services, the mailbox servers and the client access server may operate as independent applications that are co-located on a single operating platform (for example, a single server). An example of such a single operating platform for co-locating and operating the availability services, mailbox servers and client access servers is EXCHANGE® manufactured by MICROSOFT CORPORATION of Redmond, Wash. Alternatively, each of the availability service, mailbox server, or client access server may be operated on separate operating platforms (for example, separate servers) where separate components may access each other, as described herein, via a distributed computing network 205. For example, as described below, an availability data query received at a first availability service 210 may be passed to a second or alternate availability service 220 operating on a different platform or server if availability data responsive to the query is associated with the second availability service. Alternatively, a number of mailbox servers or different instances of a single mailbox server may be co-located on a single server platform and a different operating instance of a single availability service 210 may be programmed for retrieving data from each mailbox server 215, 225.

Figure 3:
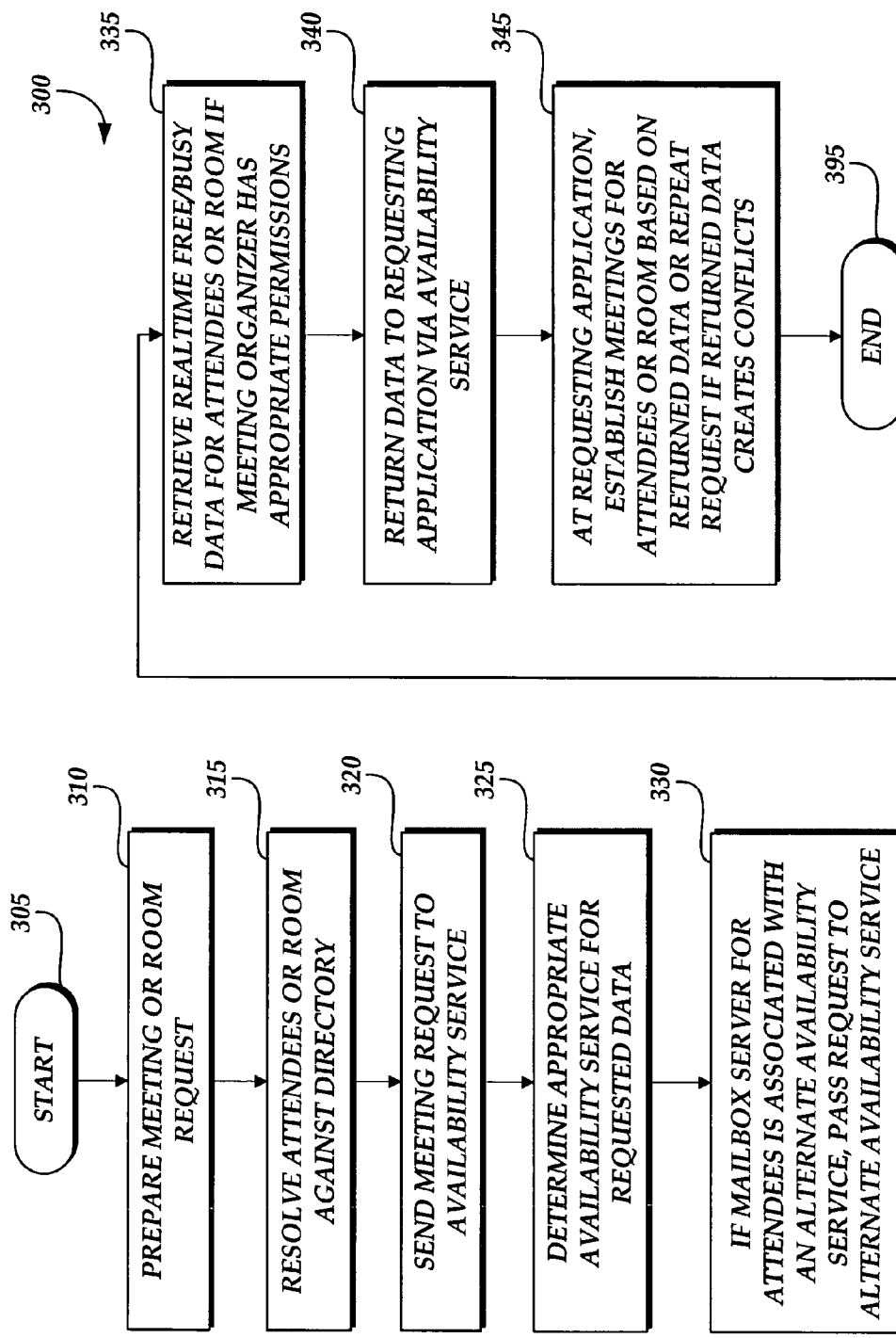
FIG. 3 is a logical flow diagram showing an illustrative routine for requesting and retrieving availability data for one or more attendees and/or assets for use by a requesting calendaring application.

FIG. 3 is a logical flow diagram showing an illustrative routine for requesting and retrieving availability data for one or more attendees and/or assets for use by a requesting calendaring application. Having described an exemplary operating architecture and operating environment for embodiments of the present invention with respect to FIGS. 1 and 2, the following is a description of an example operation of embodiments of the present invention with respect to the retrieval of availability data for one or more potential attendees and/or assets by a requesting meeting organizer. For purposes of simplicity, the term "attendee" is used hereinafter to refer to a person or asset for which availability data is required. Referring then to FIG. 3, the routine 300 begins at start block 305 and proceeds to preparation block 310 where a meeting request is prepared by a meeting organizer on a client calendaring application 106 (for example, OUTLOOK® manufactured by Microsoft Corporation). For example, a meeting organizer may desire to schedule a management meeting for three members of a management team, and the organizer may desire to schedule the meeting in a particular conference room. In order to schedule the desired meeting, the meeting organizer, using the application 106, enters or selects the names of the desired attendees and the desired conference room for the meeting.

As should be appreciated, the meeting request may be prepared using a meeting request user interface of the application 106 with which the organizer may enter the desired names/identifications of the desired attendees or with which the organizer may select the desired attendees from a directory of potential attendees and assets maintained by the organizer's organization or institution. At resolution block 315, after submitting the meeting request to determine whether each of the potential attendees may be scheduled at a desired meeting time, the application 106 resolves the attendees against a directory of persons and/or assets to determine whether the entered names and/or identifications are accurate. For example, if the meeting organizer manually types the name of a desired attendee into a user interface of the application 106, and the organizer misspells the name of one of the potential attendees, the organizer may be presented with an error that the entered potential attendee is not located in a directory of potential attendees to which the organizer may send meeting requests.

At send operation 320, the application 106 passes an availability data query (free/busy data query) to the availability service 210 for retrieving availability data for each of the desired meeting attendees. That is, the data query passed from the application 106 is for purposes of determining whether the desired meeting attendees are free (nothing presently scheduled) or busy (a meeting or other appointment currently scheduled) at the desired meeting time. As should be appreciated, if it is determined that one or more of the desired attendees are busy at the desired meeting time, the meeting organizer may select an alternate meeting time for the desired meeting. That is, the availability service provides the organizer with free/busy information to allow the organizer to make decisions about when to schedule a meeting.

At determination operation 325, the availability service 210 receives the availability data query from the application 106 and determines whether it is associated with a mailbox server 215 containing the names/identifications for the desired meeting attendees. According to an embodiment, the availability service 210 parses the list of desired attendees and/or assets received in the data query to determine what mailbox server contains electronic mail and/or calendaring data for each of the referenced attendees. According to one embodiment, the application service 210 compares the desired attendees against a list of persons and/or assets in an information directory that identifies persons and/or assets of a given organization and that identifies a mailbox server 215, 225 on which electronic mail and calendaring information for those persons and/or assets is maintained. An example of such an information directory includes Active Directory® manufactured by MICROSOFT CORPORATION. As should be appreciated, any number of databases of persons and/or assets may be utilized for storing information such as mailbox server location associated with given persons and/or assets and may be queried by an application service 210 as described herein.

If the availability service 210 determines that availability data for one or more of the desired attendees is located on a mailbox server 225 not associated with the receiving availability service 210, the availability service 210 may pass the data query to an alternate availability service 220 associated with the alternate mailbox server 225 on which information for one or more of the desired attendees is maintained. As should be appreciated, information for one or more of the desired attendees may be maintained on one mailbox server 215, and availability information for a second one or more of the desired attendees may be maintained on an alternate mailbox server 225 operated by a different organization to which the second one or more desired attendees assets belong.

As described above, each of the availability service 210 and alternate availability service 220 may be separate instances of a single availability service operated by a single organization for retrieving availability data from different mailbox servers 215, 225 or different instances of single mailbox server 215, 225 associated with different entities within a single organization. For example, a first availability service 210 and associated mailbox server 215 may be operated for a manufacturing division of an organization, and an alternate availability service 220 and mailbox server 225 may be operated for a different division of the same organization, for example, a sales division. The first availability service 210 may determine an identification for an alternate availability service 220 associated with an alternate mailbox server 225 on which desired information is maintained from an information directory that associates information on desired meeting attendees with a given mailbox server 225 and an associated alternate availability service 220.

At data retrieval operation 335, the availability service determines whether the meeting organizer has permissions to retrieve the requested availability data for the desired attendee or asset, as described below. If the organizer has the appropriate permissions, the availability data query is sent to the mailbox server 215, 225 by one of the associated availability services 210, 220 and availability data (free/busy data) for the referenced attendees is retrieved. For example, if the meeting request is for Tuesday at 2:30 p.m., the availability data query will retrieve from the mailbox servers 215, 225 data for each of the referenced attendees assets for determining whether each of the referenced attendees and/or assets are free or busy on Tuesday at 2:30 p.m.

According to embodiments of the present invention, individual persons (potential attendees) may set data retrieval permissions on their individual calendar data that will restrict the types of availability data that may be retrieved. Likewise, permissions may be set for restricting the types of availability data that may be retrieved for a given organization asset (for example, video teleconference equipment). As should be appreciated, calendaring data maintained by a given person may be data that is considered private or otherwise sensitive information. For example, a given person may desire that availability data may not be obtained for her during a period in which she is conducting meetings regarding sensitive information. Or, a given person may limit or restrict the retrieval of availability data beyond a certain time in the future. For example, a given person may desire that no availability data from her calendar be available beyond six months from the current date. Similarly, an organization may restrict access to certain organization assets to certain requesting meeting organizers or for certain periods of time.

An individual potential attendee or an administrator for organization assets may set permissions on availability data via a user interface operated by a client calendaring application 106. As should be appreciated, according to this embodiment, an organization administrator may set certain restrictions and/or limitations on retrievable availability data for all potential meeting attendees of a given organization and/or for all available assets of an organization, or the administrator may set different types of information retrieval permissions for different persons or classes of persons and/or assets.

Because the availability data for requested attendees is being retrieved by the availability services 210, 220 from the mailbox servers 215, 225 on which availability information for various persons and/or assets is maintained, the information is real time as of the time the data query is received at the mailbox server 215, 225. That is, the mailbox servers 215, 225 contain real time calendaring information entered by or for each potential attendee for a given organization as opposed to a periodically published snapshot of availability information. Thus, the difficulty of receiving out of date availability data, as is the case with prior methods and systems, is avoided.

At return operation 340, availability data responsive to the availability data query is returned to the availability service 210 from the mailbox server 215. Alternatively, if the availability data is returned from an alternate mailbox server 225, the data is returned to the alternate availability service 220 and is then forwarded to the requesting availability service 210. The availability data responsive to the data query is then passed from the availability service 210 back to the requesting application 106. At meeting setup operation 345, the requesting application 106 utilizes the returned availability data to determine whether the desired meeting may be established at the date and time requested by the meeting organizer. That is, if all desired attendees and/or assets are available at the requested meeting date and time, then a meeting may be established for the desired attendees and/or assets at the requested date and time. However, if the returned availability data indicates that one or more of the desired attendees are busy at the requested meeting time, then the process described herein may be repeated for determining availability data for the desired attendees at a different meeting time.

As should be appreciated, according to embodiments of the present invention, a user interface may be provided by the application 106 to allow the meeting organizer to request availability data for each of the potential attendees for a lengthy period into the future so that the meeting organizer may schedule a meeting at a date and time that is available for all desired attendees. That is, the organizer is not required to submit a particular date and time to determine if all desired attendees and/or assets are available at that particular date and time followed by a second request for a second potential date and time if the first date and time are not available for all desired attendees. The organizer may utilize embodiments of the present invention to see availability data for each of the desired attendees and/or assets for a given period of time, for example, the next six months, so that the meeting organizer may select a desired meeting date and time from the returned availability data. The routine 300, illustrated in FIG. 3, ends at termination block 395.

According to embodiments of the present invention, the data queries and responses sent between the components 106, 210, 215, 220, 225, described above, including the availability data queries sent from the application 106 to the mailbox servers via the availability services and the responsive data returned to the requesting application from the availability services is structured according to a self-describing language such as the Extensible Markup Language (XML) for enhancing the efficiency with which the components may operate on the data queries or responses. As is well known to those skilled in the art, the Extensible Markup Language allows data to be formatted and structured such that components of the data may be identified according to self-describing markup tags. For example, an availability data query according to embodiments of the present invention may be passed between the components described in FIGS. 2 and 3 as an XML structured message where each component of the message is associated with a self-describing markup tag. For example, meeting time may be associated with a meeting time tag, meeting date may be associated with a meeting date tag, an attendee may be associated with an attendee tag, a desired asset may be associated with an asset tag, and the like.

An XML schema file may be associated with the XML structured data query that defines the XML grammar, syntax and definitions associated with the XML structured data query. That is, the XML schema file associated with the data query defines the meaning of each of the XML tags applied to the data query. Thus, any receiving component, for example, the availability service 210, 220 or individual mailbox servers 215, 225 may utilize the data query according to the XML structure in accordance with the definitions applied to the query according to the XML schema file. Thus, any receiving or utilizing component of the data query that is operable to consume XML may read and utilize the data query based on the associated XML schema file.

According to this embodiment, if an alternate availability service 220 and alternate mailbox server 225 are operated by an organization different from the meeting organizer where the alternate availability service and alternate mailbox server are operated according to different or perhaps incompatible computer programming and operating systems from the meeting organizer's systems, the alternate availability service 220 and alternate mailbox server 225 may nonetheless read and respond to the data query if the alternate availability service 220 and alternate mailbox server 225 are operable to consume XML according to an associated XML schema file. For example, if the desired attendee names and desired meeting times are associated with XML tags that are defined by the associated XML schema file, the receiving alternate availability service and receiving alternate mailbox server 225 (according to the present example) may understand the data that is requested by the data query by extracting the attendee names and meeting times from the data query by locating that data in the data query according to the XML tags associated with that data in the query and defined for that data by the associated XML schema file. Likewise, availability data returned from the availability services 210, 220 and the mailbox servers 215, 225 may be structured according to the Extensible Markup Language for passing back to the application 106 to allow the application 106 to more efficiently read and understand the returned data.

According to another embodiment, one or more application programming interfaces (API) may be exposed for allowing one or more calendaring applications 106 to obtain availability data from the mailbox servers via the availability services described herein. Thus, each requesting application 106 (including third party calendar applications) is not required to develop separate methods for retrieving data from the appropriate mailbox servers. For example, an application programming interface such as GetCalendarViews( ) may be made available to requesting applications for querying one or more mailbox servers via the availability services, as described above. A number of parameters may be passed with the API for requesting different amounts and types of data. For example, one parameter may identify a potential attendee or asset by electronic mailbox address. Another parameter may specify a time period during which availability data is requested. Other parameters may be used for filtering the data that is returned in response to the query based on one or more filtering properties.

As described herein, methods and systems are provided for retrieving real time availability data for one or more potential meeting attendees or assets. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A computer storage medium containing computer executable instructions which when executed by a computer perform a method of obtaining availability data for one or more potential meeting attendees, comprising:

receiving, at a first availability service, an availability data query for a specific meeting event initiated via a calendaring application by a meeting organizer;

comparing, by the first availability service, the one or more potential meeting attendees against a list of persons in an information directory, wherein the information directory identifies one or more mailbox servers on which information for the one or more potential meeting attendees is maintained;

determining, by the first availability service, a first mailbox server that includes real time availability data for a first potential meeting attendee of the one or more potential meeting attendees and a second mailbox server that includes real time availability data for a second potential attendee of the one or more potential meeting attendees, wherein the second mailbox server is associated with a second availability service, and wherein the second availability service is different from the first availability service;

determining whether permissions on individual calendar data set by the first potential meeting attendee of the one or more potential meeting attendees allow a retrieval by the calendaring application of the real time availability data for the first potential meeting attendee of the one or more potential meeting attendees, the permissions being configured to restrict an amount and type of real time availability data that is retrievable by the calendaring application;

upon determining that the real time availability data for the first potential meeting attendee is retrievable by the calendaring application, determining a type of real time availability data that is retrievable by the calendaring application, wherein the type of real time availability data comprises at least one of: a free/busy type of availability data and a detailed type of availability data;

requesting, by the first availability service, the real time availability data of the type that is retrievable by the calendaring application for the first potential meeting attendee of the one or more potential meeting attendees from the first mailbox server;

requesting, by the first availability service, real time availability data for the second potential meeting attendee from the second availability service;

receiving, at the first availability service, the real time availability data of the type that is retrievable by the calendaring application for the first potential meeting attendee of the one or more potential meeting attendees, wherein the real time availability data indicates whether the first potential meeting attendee of the one or more potential meeting attendees is free or busy for the specific meeting event;

receiving, by the first availability service, the real time availability data for the second potential meeting attendee from the second availability service; and forwarding the real time availability data of the type that is retrievable by the calendaring application for the first potential meeting attendee of the one or more potential meeting attendees and the real time availability data for the second potential meeting attendee from the first availability service to the calendaring application.

2. The computer storage medium of claim 1, further comprising establishing a meeting with the one or more potential meeting attendees based on the real time availability data received by the calendaring application for the one or more potential meeting attendees.

3. The computer readable storage medium of claim 1, wherein the free/busy type of real time availability data that can be retrieved by the calendaring application meeting organizer for the one or more potential meeting attendees comprises information showing dates and times the one or more potential meeting attendees are free and showing dates and times the one or more potential meeting attendees are busy.

4. The computer storage medium of claim 3, wherein the free/busy type of real time availability data that can be retrieved by the calendaring application for the one or more potential meeting attendees comprises one or more from the group consisting of: public information, non-sensitive information, and unrestricted information.

5. The computer storage medium of claim 1, wherein receiving the availability data query at the first availability service includes receiving a meeting request initiated by the calendaring application for the one or more potential meeting attendees.

6. The computer storage medium of claim 1, wherein receiving the availability data query at the first availability service includes receiving the availability data query as an Extensible Markup Language (XML) structured data query.

7. The computer storage medium of claim 1, further comprising:
providing an application programming interface (API) in a form GetCalendarViews( ) for querying the first availability service for the real time availability data for the one or more potential meeting attendees.

8. The computer storage medium of claim 1, wherein the detailed type of real time availability data that can be retrieved by the calendaring application for the one or more potential meeting attendees comprises one or more from the group consisting of: private information, sensitive information, and restricted information.

9. The computer storage medium of claim 1, wherein it is determined that retrieval of real time availability data for the first potential meeting attendee of the one or more potential meeting attendees by the calendaring application is not allowed.

10. A system for obtaining availability data for one or more meeting request attendees, comprising:
one or more mailbox servers, wherein the one or more mailbox servers store individual calendar data for the one or more meeting request attendees;
an availability service memory storage;
an availability service processing unit coupled to the one or more mailbox servers and the availability service memory storage, wherein the availability service processing unit is operative to:
receive, at a first availability service, an availability data query initiated via a calendaring application for a specific meeting event,
compare, by the first availability service, the one or more meeting request attendees against a list of persons in an information directory, wherein the information directory identifies the one or more mailbox servers;
determine, by the first availability service, a first mailbox server that includes real time availability data for a first meeting request attendee of the one or more meeting request attendees and a second mailbox server that includes real time availability data for a second meeting request attendee of the one or more meeting request attendees, wherein the second mailbox server is associated with a second availability service, and wherein the second availability service is different from the first availability service;
determine whether permissions on individual calendar data set by the first meeting request attendee of the one or more meeting request attendees allow a retrieval by the calendaring application of the real time availability data for the first meeting request attendee of the one or more meeting request attendees, the permissions being configured to restrict an amount and type of availability data that is retrievable by the calendaring application,
upon determining that the availability data for the first meeting request attendee is retrievable by the calendaring application, determining a type of availability data that is retrievable by the calendaring application, wherein the type of availability data comprises at least one of: a public type of availability data and a private type of availability data,
request, by the first availability service, the real time availability data of the type that is retrievable by the calendaring application associated with the first meeting request attendee of the one or more meeting request attendees from the first mailbox server,
request, by the first availability service, real time availability data for the second meeting request attendee from the second availability service;
receive, at the first availability service, the real time availability data of the type that is retrievable by the calendaring application for the first meeting request attendee of the one or more potential meeting attendees, wherein the real time availability data indicates whether the first meeting request attendee of the one or more potential meeting attendees is free or busy for the specific meeting event;
receive, by the first availability service, the real time availability data for the second meeting request attendee from the second availability service; and forward the real time availability data of the type that is retrievable by the calendaring application for the first meeting request attendee of the one or more meeting request attendees and the real time availability data for the second meeting request attendee from the first availability service to the calendaring application.

11. The system of claim 10, wherein the public type of availability data associated with the one or more meeting request attendees comprises information showing dates and times the one or more meeting request attendees are free and showing dates and times the one or more meeting request attendees are busy.

12. The system of claim 10, wherein the private type of availability data associated with the one or more meeting request attendees comprises one or more from the group consisting of: private information, sensitive information, and restricted information.

13. A computer-implemented method of obtaining real time availability data for one or more potential meeting attendees, comprising:

receiving, at a first availability service, an availability data query for a specific meeting event initiated via a calendaring application;

comparing, by the first availability service, the one or more potential meeting attendees against a list of persons in an information directory, wherein the information directory identifies one or more mailbox servers on which information for the one or more potential meeting attendees is maintained;

determining, by the first availability service, a first mailbox server that includes real time availability data for a first potential meeting attendee of the one or more potential meeting attendees and a second mailbox server that includes real time availability data for a second potential attendee of the one or more potential meeting attendees, wherein the second mailbox server is associated with a second availability service, and wherein the second availability service is different from the first availability service;

determining whether permissions on individual calendar data set by the first potential meeting attendee of the one or more potential meeting attendees allow a retrieval by the calendaring application of the real time availability data for the first potential meeting attendee of the one or more potential meeting attendees, the permissions being configured to restrict an amount and type of availability data that is retrievable by the calendaring application;

upon determining that the real time availability data for the first potential meeting attendee is retrievable by the calendaring application, determining a type of availability data that is retrievable by the calendaring application, wherein the type of availability data comprises at least one of: a free/busy type of availability data and a detailed type of availability data;

requesting, by the first availability service, the real time availability data of the type that is retrievable by the calendaring application for the first potential meeting attendee of the one or more potential meeting attendees from the first mailbox server;

requesting, by the first availability service, real time availability data for the second potential meeting attendee from the second availability service;

receiving, at the first availability service, the real time availability data of the type that is retrievable by the calendaring application for the first potential meeting attendee of the one or more potential meeting attendees, wherein the real time availability data indicates whether the first potential meeting attendee of the one or more potential meeting attendees is free or busy for the specific meeting event;

receiving, by the first availability service, the real time availability data for the second potential meeting attendee from the second availability service; and forwarding the real time availability data of the type that is retrievable by the calendaring application for the first potential meeting attendee of the one or more potential meeting attendees and the real time availability data for the second potential meeting attendee from the first availability service to the calendaring application.

14. The computer-implemented method of claim 13, wherein receiving the availability data query at the first availability service includes receiving the availability data query as an Extensible Markup Language (XML) structured data query.

15. The computer-implemented method of claim 13, wherein the detailed type of availability data having the permissions set by the one or more potential meeting attendees comprises one or more from the group consisting of: private data, data associated with a date beyond a predetermined point in time, and sensitive data.

16. The computer-implemented method of claim 13, wherein the free/busy type of availability data that can be retrieved by the calendaring application for the one or more potential meeting attendees comprises one or more from the group consisting of: public information, non-sensitive information, and unrestricted information.

17. The computer-implemented method of claim 13, wherein it is determined that retrieval of real time availability data for the first potential meeting attendee of the one or more potential meeting attendees by the calendaring application is not allowed.

* * * * *